April 15, 1958 F. SCHLOSS 2,830,780

LOW FREQUENCY NOISE AND SHOCK ISOLATION MOUNT

Filed June 30, 1953 5 Sheets-Sheet 1

INVENTOR.
FRED SCHLOSS
BY George Sipkin
B. L. Zangwill
ATTORNEYS

April 15, 1958 F. SCHLOSS 2,830,780

LOW FREQUENCY NOISE AND SHOCK ISOLATION MOUNT

Filed June 30, 1953 5 Sheets-Sheet 2

INVENTOR.
FRED SCHLOSS
BY George Sipkin
B. L. Zangwill
ATTORNEYS

April 15, 1958 F. SCHLOSS 2,830,780

LOW FREQUENCY NOISE AND SHOCK ISOLATION MOUNT

Filed June 30, 1953 5 Sheets-Sheet 3

INVENTOR.
FRED SCHLOSS
BY George Sipkin
B. L. Zangwill
ATTORNEYS

April 15, 1958 F. SCHLOSS 2,830,780
LOW FREQUENCY NOISE AND SHOCK ISOLATION MOUNT
Filed June 30, 1953 5 Sheets-Sheet 4
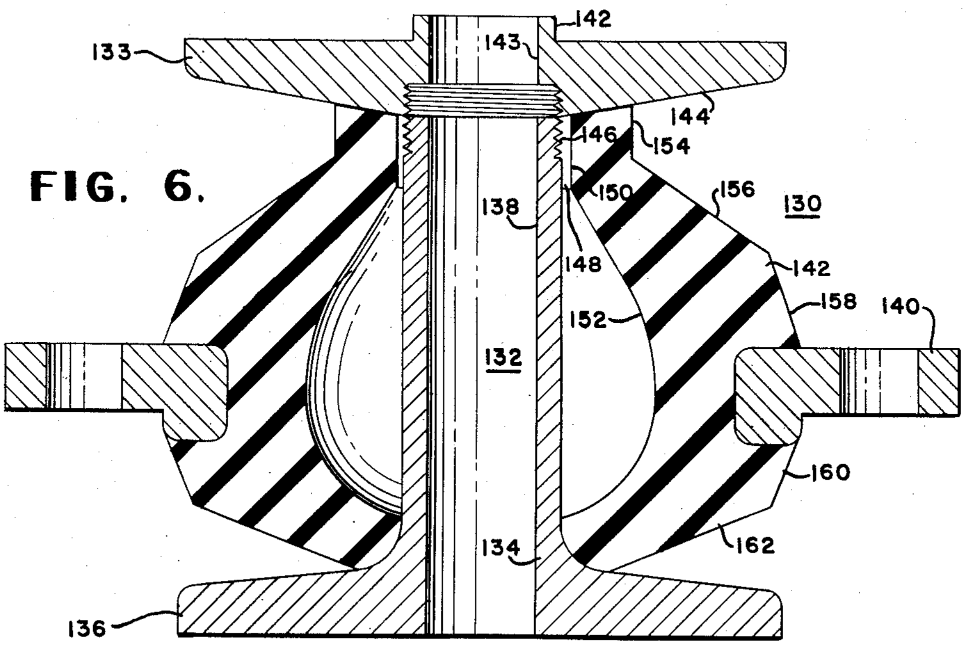
FIG. 6.
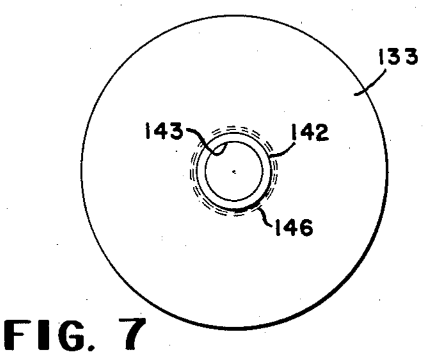
FIG. 7
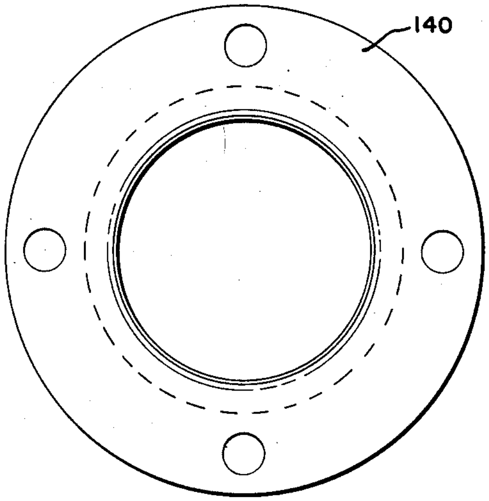
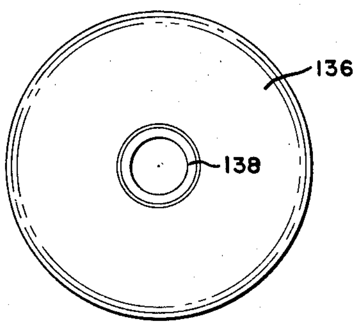
FIG. 8.
FIG. 9
INVENTOR.
FRED SCHLOSS
BY George Sipkin
B. L. Zangwill
ATTORNEYS April 15, 1958 F. SCHLOSS 2,830,780

LOW FREQUENCY NOISE AND SHOCK ISOLATION MOUNT

Filed June 30, 1953 5 Sheets-Sheet 5

INVENTOR.
FRED SCHLOSS
BY George Sipkin
B. L. Zangwill
ATTORNEYS

United States Patent Office 2,830,780
Patented Apr. 15, 1958

2,830,780

LOW FREQUENCY NOISE AND SHOCK ISOLATION MOUNT

Fred Schloss, Annapolis, Md.

Application June 30, 1953, Serial No. 365,295

12 Claims. (Cl. 248—22)

(Granted under Title 35, U. S. Code (1952), sec. 266)

The invention described herein may be manufactured and used by or for the Government of the United States of America for governmental purposes without the payment of any royalties thereon or therefor.

The present invention relates to machine mountings and more particularly to a unit for use as a noise and shock isolation mounting for machinery or the like.

With the great advances made in the development of listening devices in recent years, noise emanating from ships can more easily be detected and located, so that noise has become an important factor to the military, both in its offensive and defensive maneuvers.

Inasmuch as practically all military vessels utilize machinery of one type or another, objectionable noise inherently generated by the machinery serves to the detriment of the overall operational efficiency of the vessels, especially when functioning as a unit. Various methods may be employed to obtain reductions in such noise levels. These include careful design and high quality workmanship in the manufacture and overhaul of machinery and equipment, and the use of shock-absorbing mountings for the machinery.

In accordance with the teachings of the present invention, a noise and shock isolation mount is provided for the support of a static load such as machine elements or other equipment of a similar nature; the mount comprising, preferably, a single resilient noise-attenuating element having an upper frusto-conical portion for carrying the load and a lower portion that comes into action under shock conditions. Through a wide static load range, the mount has a smooth non-linear load-deflection characteristic which corresponds to that which yields a low substantially constant resonant frequency. In the preferred embodiment, static forces applied to the mount are carried in shear and compression whereas shock forces applied to the mount are carried essentially in compression. By static force or load on the mount is meant a relatively steady force or load such as is present for example when a stationary object or a piece of machinery is carried by the mount; it being understood that the machinery may have a rotating or other moving parts. Thus, applicant provides in a single unit, a low frequency mounting which is efficient and effective in performing the function of a heavy duty noise and shock isolator.

A phenomenon known in the art is "drift." It may be defined as a change in dimension over a period of time under a dead load. Excessive drift is an undesirable feature in the art because of the change in alignment between mounted equipment and because of the change of the final characteristics of a mount over the designed characteristics. Experience has shown that in mounts using identical rubber compounds as the resilient element and having the same natural frequency, the mount supporting the load in shear drifts considerably more than the mount supporting its load essentially in compression. The terms shear and compression are used in the sense usually used with rubber. As will be hereinafter explained the disclosed mount carries its load essentially in compression.

Accordingly, an object of the invention is the provision of a mounting having a low natural frequency for the support of an object.

Another object of the invention is the provision of a low natural frequency mount which is effective to attenuate noise emanating from the supported object and applied to the mount in an axial as well as a radial direction.

A further object of the invention is the provision of a low natural frequency mount having sufficient structural strength to withstand large dynamic forces such as arise, for example, from sharp external shocks.

Still another object of the invention is the provision of a mounting for the support of equipment having a substantially constant natural frequency over a wide load range.

A still further object of the invention is the provision of a low natural frequency mount employing a single resilient element having a non-linear load deflection characteristic.

Another object of the invention is the provision of a low natural frequency mount having adequate shock attenuation and wherein deflections or excursions of the mounting under shock are limited.

A further object of the invention is the provision of a low natural frequency mount which is highly efficient.

Other objects and many of the attendant advantages of this invention will be readily appreciated as the same becomes better understood by reference to the following detailed description in connection with the accompanying drawings, on different scales, wherein:

Fig. 6 is a side view, in section, drawn to scale, of another modification of the mounting comprising the invention, in an uncompressed position, and adapted for light load operation;

Figs. 7, 8 and 9 are plan views of the elements of the invention and showing the construction of the frame of the modification of Fig. 6;

Figure 1:
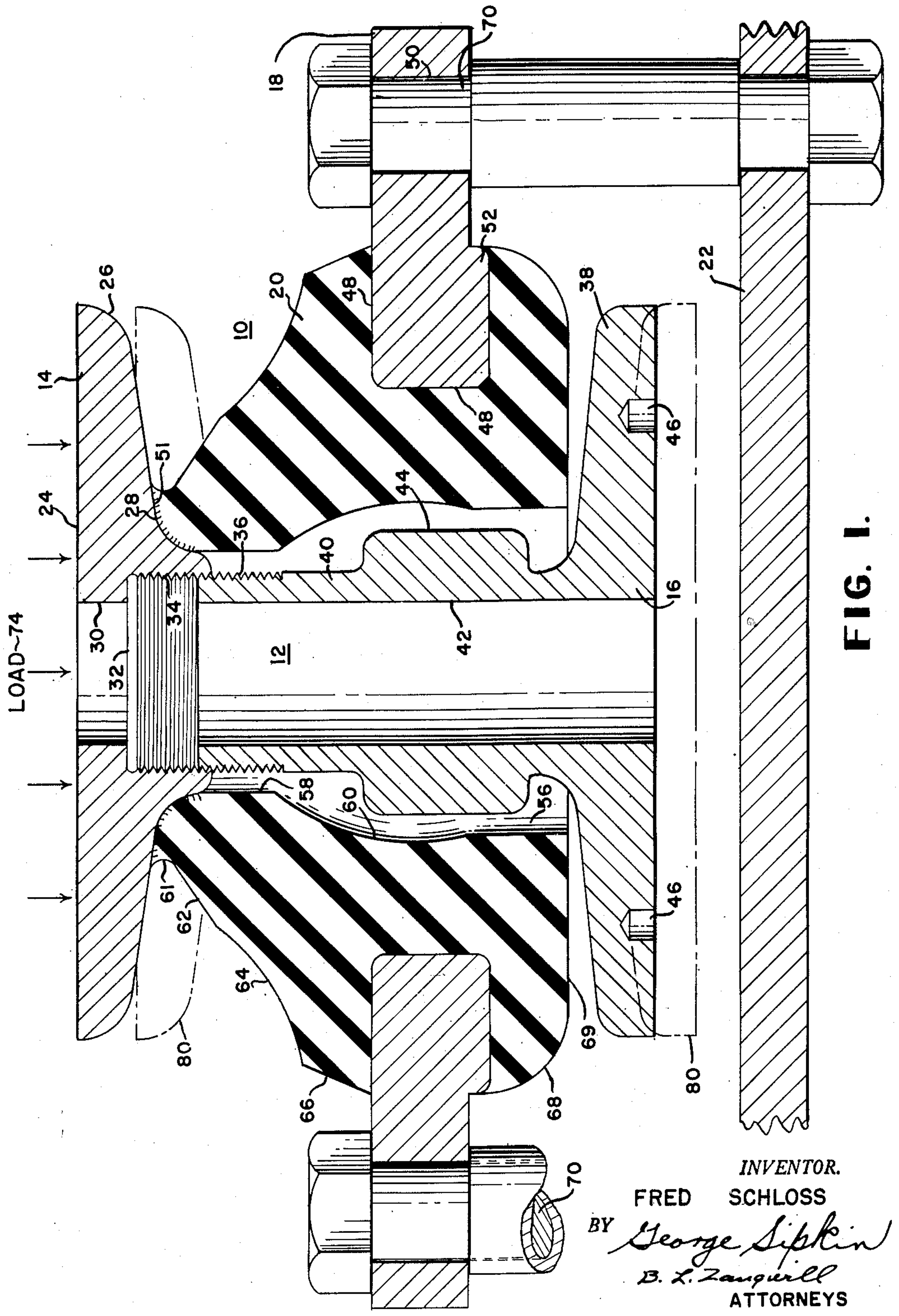
Fig. 1 is a side view, in section, of a preferred embodiment of the invention drawn to scale and shown in an uncompressed position.

Referring now to the drawings, wherein like reference characters designate like or corresponding parts throughout the several views there is shown in Fig. 1, in cross-section taken substantially through the center of the apparatus, a side elevational view of the low frequency isolation mount 10, in an uncompressed position, illustrating a preferred embodiment of the present invention. The mounting 10 comprises a spool shaped supporting frame 12 including an upper flange or mounting base 14 and a retaining member 16, a mounting plate 18 and an elastic system comprising an elastomer member 20, hereinafter called a snubber for convenience although it is to be understood that it has noise attenuation characteristics as well as snubbing action, interposed between the upper flange 14 and the retaining member 16. In a manner which will shortly become apparent, the mounting 10, supporting a load carried by the mounting base or upper flange 14, will operate to substantially isolate the load and a base 22 from shock and noise.

Figure 2:
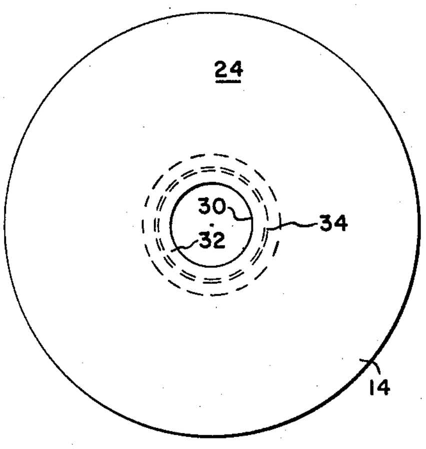
Figure 4:
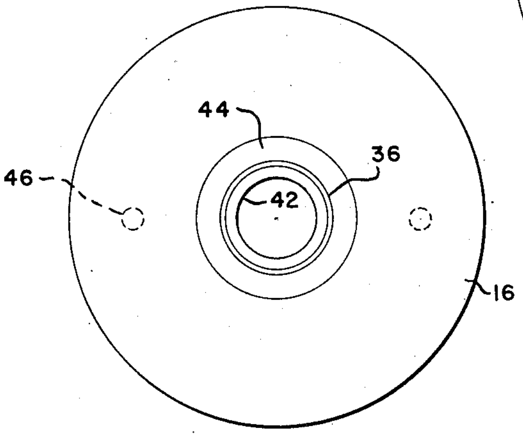

As shown in Figs. 1 and 2, the upper flange member or mounting base 14 forms the upper side of the spool shaped frame 12 and comprises an annular member having a flat upper surface 24 defining a platform adapted to support an axial load suitably secured thereto and a lower curved surface 26, as shown. The surface 26 has oppositely curved or arcuate end portions, the inner one of which forms a seat or shoulder 28 for purposes hereinafter set forth. The portion of the lower surface joining the arcuate portions is formed to extend at an angle with the flat upper surface 24 substantially as shown. Centrally located in the mounting base 14 is an aperture 30 extending therethrough, the lower portion 32 of the aperture 30 being counterbored to a depth approximating one-half the thickness of the base thereat. The counterbored portion has a threaded portion 34 throughout its entire length and is adapted to engage a similarly threaded portion 36 formed on the retaining member 16.

Retaining member 16 which comprises the lower and central portions of the spool shaped frame 12 is provided with an annular retaining flange 38 and a coupling sleeve or post 40 preferably integral therewith or suitably secured thereto to form a unitary member. Coupling sleeve or post 40, which has external threads 36 formed on the upper portion thereof, is provided with an axial bore 42 therethrough and an integral annular boss 44 suitably formed upon the sleeve, preferably near the lower end thereof. Boss 44, as hereinafter set forth, functions during lateral shock loads and reduces the deflection of the member 20 to prevent tearing therein. The retaining flange 38 is operatively parallel to mounting base 14 and is provided with an inclined upper surface and a flat under surface having a pair of suitable spanner holes 46 or the like formed therein and adapted to receive a spanner wrench for securing purposes.

Interposed between the mounting base or flange member 14 and the retaining flange member 38 and surrounding the coupling sleeve or post 40 is the body of revolution shaped elastomer member or snubber 20. The upper rim 51 of the snubber 20 is formed with a contour which is the compliment of the seat or shoulder 28 formed by the inner curved portion of the surface 26 of the mounting base 14. Rim 51 of the snubber is secured to the mounting base in the seat 28 by suitable means such as bonding or the like whereby the mounting base is retained in a predetermined position relative to the snubber. Axially spaced between the mounting base and the retaining flange and formed on the external circumference of the body of revolution comprising the snubber 20 by molding, cutting or other suitable means, is a rectangular groove 48 adapted to receive an inner rim 52 of the mounting plate 18.

Figure 3:
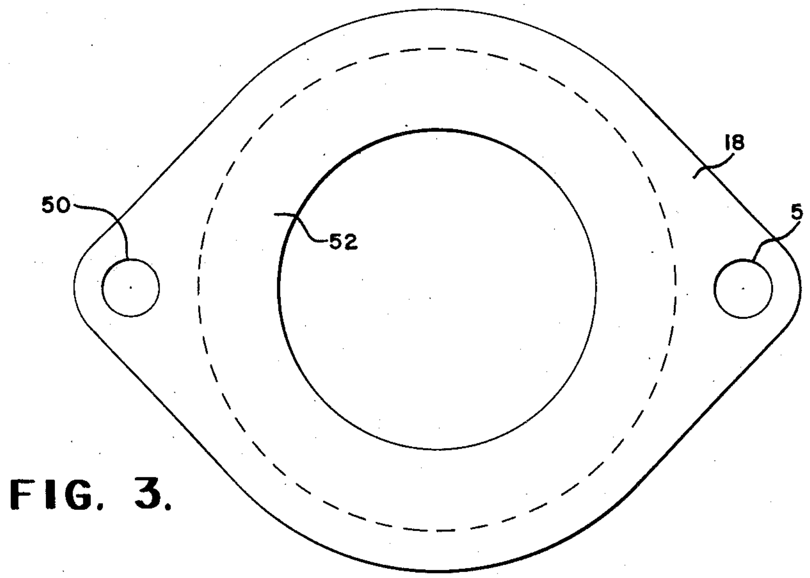
Figs. 2, 3 and 4 are plan views of the elements of the embodiment comprising a supporting frame.

As best seen in Fig. 3, mounting plate 18 is generally oval-shaped and has apertures 50 adapted to receive a securing means such as a bolt arrangement formed on each end of the major axis. The plate 18, which is provided with a centrally located, large aperture adapted to receive the snubber 20, has the rim portion 52 of the aperture of slightly greater thickness than the remaining portions. The thickened rim 52 is tightly fitted in the groove 48 of the snubber and securely fastened therein by suitable means such as, for example, bonding or the like.

Snubber or elastomer member 20 which is preferably constructed of a rubber compound is formed with such a contour as to support a static load under shear but with an increase in load, such as by shock, changes gradually to support the load in compression.

The snubber 20 is formed preferably by molding, although other suitable means such as, for example, cutting may be employed, with a large axial bore having a surface providing substantially straight edges or surface-portions at its upper end 58 and its lower end 56, the latter end having a slightly larger diameter than the former, and an arc shaped edge or a bowed or concave surface-portion 60 joining the two straight portions, with the upper end 58 of the bore defining the lower edge of the rim 51.

An enlarged air space is provided between the sleeve 40 and the snubber 20 by the arc shaped edge 60 which acts to permit free flow of the snubber when deflected due to shock.

The upper exterior contour or surface of the snubber is formed by providing varying radii of curvatures and produces a contour having a fillet 61 and a plurality of surface-portions comprising successively: a first downward and outwardly sloping edge 62, and a second arc shaped edge 64 sloping downward and outwardly, and a third downward and outwardly sloping straight edge 66 positioned between the arc shaped edge 64 and the mounting plate. The lower exterior contour or surface of the snubber is provided with an inwardly curved arc surface-portion 68 and the bottom of the snubber, adjoining the retaining plate, is formed with a straight edge surface-portion 69 joining the arc 68 and bore edge 56. It is understood of course, that each surface has been defined on the basis of one dimension, as shown in Fig. 1, for ease of explanation. However, the snubber being a body of revolution has the outward appearance of a toroidal member.

The mounting of Fig. 1, as hereinbefore stated, is shown in an uncompressed position since the actual shape of the rubber in a compressed state is dependent upon the load and the compressed shape differs with various compressed cross-sectional views.

However, each mounting before being placed into operation is precompressed. To this end, the mount is adjusted before being placed into operation. This may be done, for example, by moving retaining member 12 and base or flange 14 relatively toward each other with a resisting static load against the base 14. For proper adjustment of the mount, the engagement of members 12 and 14 should be such that the lower face 69 of the snubber 20 will be just out of contact with the retaining flange 38 when the resisting load has the value of the minimum assigned or rated static load for the mount. The mount is then properly adjusted for operation. If the static load the mount carries in operation is about the minimum for its rating, then the snubber 20 and flange 38 will not be in contact or at least in any significant contact. With the proper adjustment, the load will then be carried by the portion of the snubber 20 which lies between the flange or base 14 and the mounting plate 18. When so adjusted the upper part of the mount may be said to be precompressed. When a higher static load is applied in the range of static loads for which the mount is designed, the snubber 20 further compresses and its position changes; and for the mount of Fig. 1, designed for a load range of 700 to 2000 pounds, the deflection may be as much as ⅝ to ¾ inch, as indicated by the dotted outline 80 in Fig. 1. Under any load within the rated range, the surface 69 is spaced from flange 38.

The lower portion of the snubber, which is defined as the volume included between the rim 52 of plate 18, arc 68, edge 69 and edge 56 of the snubber bore, under shock conditions acts as a shock attenuator.

The attenuator provides small shock excursions together with good shock attenuation.

Because of the relatively smaller thickness of the elastic material the attenuator is stiffer than the upper portion of the snubber. If the attenuator did engage under normal loads the upper surface of flange 38 then the natural frequency of the whole mounting would be substantially raised. A physical separation between these elements, as shown in Figure 1, under normal loads is carefully maintained.

The inclined upper surface configuration of lower flange 38 controls the rate of engagement between such flange and the lower portion of the snubber so that no large areas rapidly engage. It should be incidentally mentioned that the varying thickness of the flange is in accordance with proper structural design considerations.

When the mount is in service under static load with a static deflection such as represented by the broken line 80, the lower surface of the flange member 14 will obviously be closer to the mounting plate 18; and this surface will be in engagement with the facing upper sloping surface of the snubber 20, the area of engagement being dependent upon the magnitude of the load.

In operation, the mount is precompressed and suitably mounted such as by bolts 70 suitably secured to the mounting plate 18 and a suitable foundation 22, with the static load being normally applied to the mounting base 14 as at 74. Of course, in particular installations, it may be preferable to support the load upon the mounting plate 18 and secure the mount by means of the mounting base but in either event, the operation and characteristics of the mounting will be similar.

The lower portion of the snubber will have little or no effect during an axial static loading but will act as a shock protector for the mounting wherever shock forces are applied in the upward direction. That is, whenever a shock load is received in an upward direction, the retaining flange will tend to engage this bottom portion of the snubber, whereupon the snubber will be placed in compression to absorb the shock.

Figure 10:
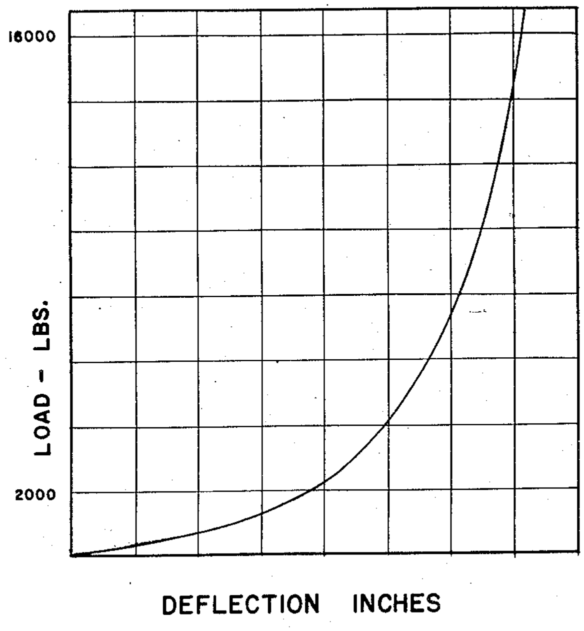
Fig. 10 is a graphical view of a Load vs Deflection curve of the preferred embodiment of the invention.

It is to be noted that in order to provide a constant natural frequency over a wide load range, a non-linear force-deflection curve of an isolator mount is desired. In such an instance, to determine a theoretical load-deflection curve of a mounting wherein the natural frequency of a mounting is constant, the derivative $$\frac{dW}{d\delta}$$

which is the slope at any corresponding portion of the curve of Fig. 10, is substituted for the stiffness coefficient K in the equation:

$$f_n=\frac{1}{2\pi}\sqrt{\frac{Kg}{W}}$$

where:
$f_n$=natural frequency of the mount
$K$=stiffness coefficient
$g$=acceleration
$W$=weight of the mounted body By rearranging terms and integrating, we obtain:

$$\delta=\frac{g}{4\pi^2 f_n^2}\left(\int_n W-\int_n W_0+1\right)$$

where
$W_0$=weight of the mounted body where non-linearity begins
$\delta$=deflection of the mount In plotting a load-deflection curve from the above desired formula and in plotting the actual curve of the mounting of Fig. 1, with the load in pounds as the ordinates and deflection in inches as the abscissa, a single curve such as illustrated in Fig. 10 was obtained. It will be seen that the mounting of Fig. 1, which is rated at 700 to 2000 pounds has $W_0$ as 700 pounds, while the upper rated load is limited merely by the mechanical strength of the metal parts. Therefore, it will be appreciated that a mounting is obtained with a constant natural frequency which for the mount of Fig. 1 is substantially six cycles per second.

Figure 11:
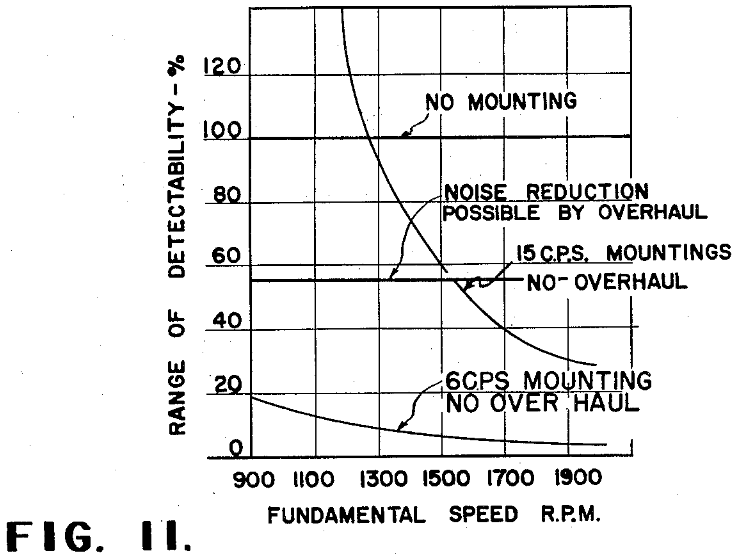
Fig. 11 is a graphical view of a curve having the Range of Detectability as ordinates and the Rotating speed of a machine element as abscissa.

In order to further illustrate the advantage of a low natural frequency with relation to the noise attenuation of the mounting and the efficiency as an isolator, attention is directed to Fig. 11 wherein the Range of Detectability by a conventional listening apparatus is plotted as an ordinate and with a noise generating mechanism rotating at various revolutions per minute being plotted as an abscissa. Various curves are illustrated and wherein each curve illustrates the mechanism as supported by various types of mountings. Range of Detectability in percent is employed as the ordinates rather than actual distance for convenience only.

Noteworthy is the fact that with a mounting of the present invention, for a variation in rotating speed from 900 to 1900 revolutions per minute, the range of detectability was only 4 to 19%.

It will be noted that the above results were obtained with the elastomer member 20 being constructed of a synthetic rubber compound such as, for example, the trademark product "Neoprene." However, the characteristics of natural rubber wherein the ratio of dynamic stiffness to static stiffness is slightly better than synthetic rubber compounds provide even better results under the same conditions. It is obvious of course that either type may be employed in practicing the invention.

Figure 5:
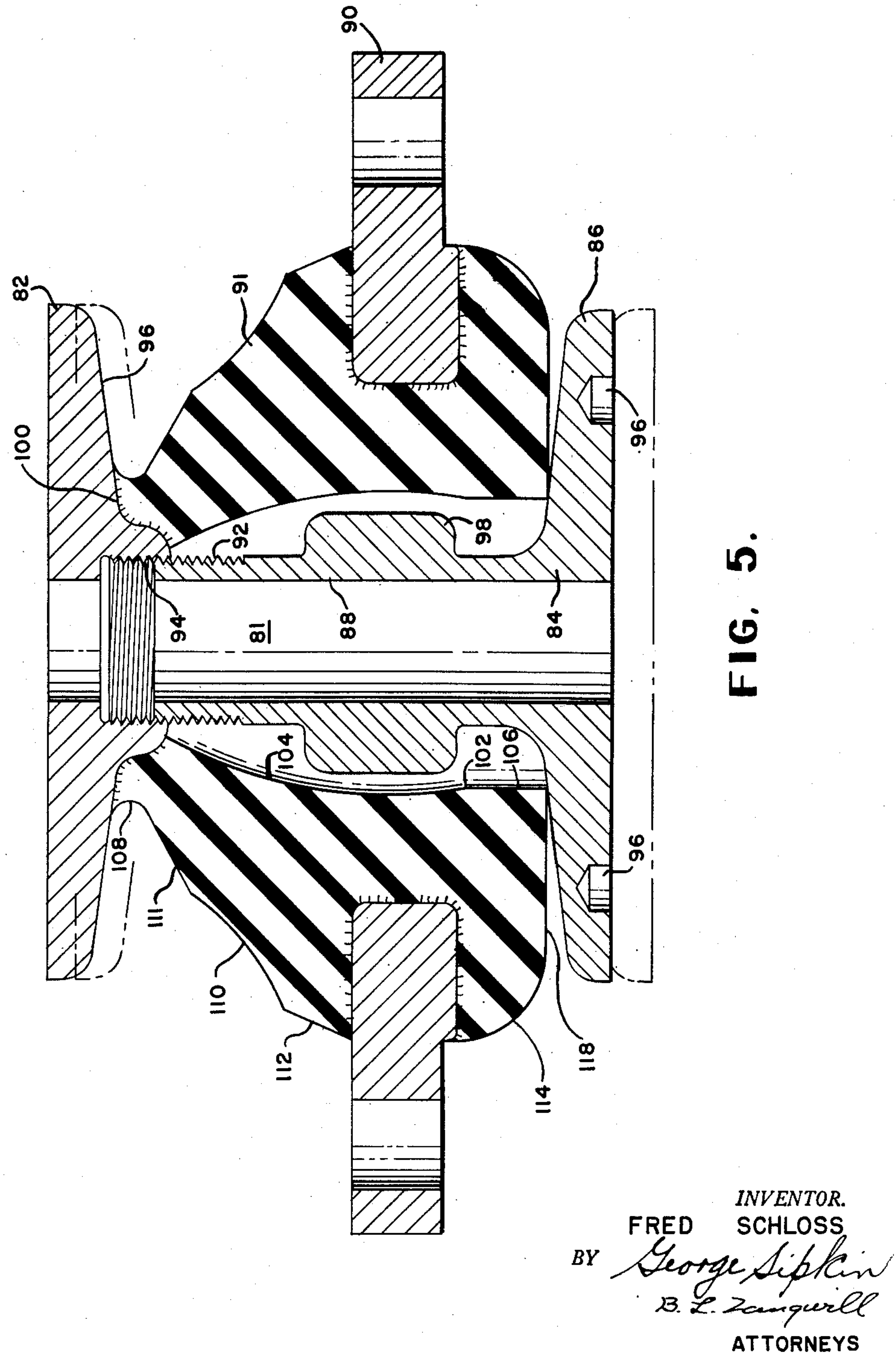
Fig. 5 is a side view, in section, drawn to scale, of a modification of the mounting, in an uncompressed position, and adapted for medium load operation.

Fig. 5 discloses a modification of the invention which is essentially the same as the embodiment of Fig. 1. This modification is adapted for medium load operation, that is, having a rated load capacity of approximately 400 to 900 pounds. As in the embodiment of Fig. 1, the mounting of Fig. 5 is provided with a spool shaped supporting frame 81 having a circular mounting base or upper flange 82, a retaining member 84 including a circular retaining flange 86 and a coupling sleeve 88, a mounting plate 90 and an elastic system comprising a body of revolution shaped elastomer member 91, termed a snubber for convenience, preferably of a rubber compound.

The retaining member 84 and the mounting base 82 are each provided with cooperating threaded portions 92 and 94 respectively whereby the members may be securely fastened together. Also, spanner holes 96 are conveniently provided upon the undersurface of the retaining flange 86 and adapted to receive a spanner tool or the like to fasten the members. It is obvious, of course, that other suitable types of fastening means may be employed for securing the members together. Also, no means of securing the mount in position are shown in Fig. 5 but any suitable means such as the bolt arrangement of Fig. 1 may be employed.

Each of the components comprising this modification thus are similar in construction and function as the components comprising the embodiment of Fig. 1 but have their respective dimensions reduced to accommodate the smaller load and have minor changes therein. Since the mounting is adapted for a lighter rated load, the boss 98 formed on the coupling sleeve 88 has been raised slightly relative to the retaining flange 86 and the snubber 91 is secured to the mounting base 82 in a seat 100 formed on the underside thereof by suitable means such as bonding or the like. Snubber 91 is provided with an axial bore 102 comprising a large arc shaped edge 104 joining the rim of the snubber and a straight edge portion 106 at the lower end of the bore. Thus, the arc shaped edge or surface-portion 104 defines an enlarged air space within the bore between the snubber and the sleeve and the boss 98 is raised to cooperate with the snubber.

The exterior contour or surface of the snubber 91 remains unchanged aside from a reduction in the respective dimensions and includes a fillet 108 connecting the rim 109 of the snubber with a substantially straight edge portion 111 extending downward and outwardly, an arc shaped edge 110 extending downward and outwardly, a straight edge portion 112 extending downward and outwardly between the mounting plate and edge 110, and a lower inwardly sloping arc shaped edge portion 114 forming an edge surface between the lower surface of the mounting plate 90 and a bottom straight edge portion 113.

Before being placed into operation, the retaining member and the mounting plate are secured together to precompress the rubber snubber as in the embodiment of Fig. 1. The amount of compression is such that upon applying the minimum rated static load to the mount, the snubber will be deflected and will just break contact with the retaining flange. The action of the mounting under static and dynamic loads is similar to the action of the modification of Fig. 1 with the mount having a constant natural frequency of substantially 6 cycles per second for its rated load.

A further embodiment of the invention is disclosed in Fig. 6 wherein a side elevational view of a low frequency isolation mount 130 is disclosed and which mount is adapted for light load operation. The mount has a rated load capacity of approximately 75 to 200 pounds.

Basically, mount 130 is the same as the large and medium capacity mounts of Figs. 1 and 5 and has a constant natural frequency of approximately 6 cycles per second.

As shown in Figs. 6–9, mount 130 includes a spool shaped supporting frame 132 comprising an annular mounting base or upper flange 133, an integral retaining member 134 including an annular retaining flange 136 and a coupling sleeve 138 having an axial bore therethrough, an annular mounting plate 140 supported intermediate the mounting base and the retaining flange 136 by a body of revolution shaped elastomer member 142, termed a snubber for convenience, which is interposed between the base 133 and flange 136.

The mounting base 133 comprises an annular disc member having a flat upper surface with a raised portion 142 surrounding a centrally located aperture 143 therethrough and an outwardly sloped undersurface 144. Aperture 143 is counterbored on the lower end thereof and threaded whereby a threaded portion 146 formed on the upper end of the coupling sleeve is operative to cooperate therewith to adjustably secure the retaining member 132 and the mounting base 133 together.

Elastomer member or snubber 142 which is preferably constructed of a rubber compound is interposed between the mounting base 133 and retaining flange 136 and has an axial bore 148 therethrough. The top portion of the axial bore defines a straight edge surface-portion 150 with the remaining edge surface-portion 152 defining a gradual arc such that the upper portion of the arc has a larger radius than the lower surface-portion thereof. Arc 152 and sleeve 138 form an enlarged air space therebetween which air space permits free movement of snubber 142 upon deflection.

The exterior contour or surface of the snubber is formed to provide a body of revolution having the same number of slopes as the prior embodiments and include a first straight edge 154 intersecting the rim portion, a second outward and downwardly sloping straight edge 156, and a third outward and downwardly sloping straight edge 158 between the mounting plate 140 and the straight edge 156 with the lower portion of the snubber having an inwardly sloping straight edge 160 adjacent the lower edge of the mounting plate and a second inwardly sloping straight edge 162 intersecting the bottom rim.

It will be noticed that the snubber 142 is not secured to the mounting base 133 nor is a boss provided on the sleeve 138. Inasmuch as the mounting 139 is designed for relatively light loads, the forces encountered in operation do not demand such countermeasures.

In operation, the retaining member 132 is secured to the mounting base 133 by engaging the respective cooperating threaded portions and tightened to precompress the snubber 142.

Thus, it can be seen from the above that applicant has provided an improved low drift single-unit mounting for structural units, preferably machinery, having a low constant natural frequency whereby very efficient noise attenuation is obtained and which mounting is capable of withstanding and attenuating sudden and severe shock loads.

It is to be observed in all of the embodiments, that the lower surface-portions, such as 96 and 144, of the upper flange members and the upper surface-portions, such as 62, 64, 111, 110, 156 and 158; of the snubber radially diverge, and that the latter extends substantially to the associated mounting plate. Similarly there is a portion of the snubber between the mounting plate and the lower flange member, but this portion, as previously set forth, comes into action primarily under shock conditions.

It should be understood, of course, that the foregoing disclosure relates to only preferred embodiments of the invention and that numerous modifications or alterations may be made therein without departing from the spirit and scope of the invention as set forth in the appended claims.

What is claimed and desired to be protected by Letters Patent of the United States is:

1. A resilient mount comprising a first flange member, a second flange member, a post interconnecting said flange members in spaced relationship to form a spool, a resilient annular body surrounding and spaced from said post and having one end portion secured to said first flange member, said body being thicker adjacent said second flange than adjacent said first flange, a mounting plate secured in said body near the end thereof adjacent said second flange, the outer surface of said body having a steep portion adjacent said first flange, a less steep portion adjacent said mounting plate and an intermediate portion of less steepness than the first and second portions of said surface, the inner surface of said body defining a bore having a concave surface-portion having its relatively small diameter between said first flange and said mounting plate, and a maximum diameter at said thicker portion adjacent said mounting plate.

2. A resilient mount of low natural frequency comprising, in combination when vertical, an upper flange member having an under surface-portion, a lower flange member having an upper surface-portion, a post interconnecting said flange members in spaced relation to form a spool, a resilient annular body between said flange members and having an inner bore surrounding said post, said body being thicker adjacent said lower flange member than adjacent said upper flange member, a mounting plate secured in a recess in said thicker portion of said body near the end thereof adjacent said lower flange member, said body having a portion between said mounting plate and said lower flange member, said body having an outer surface with an upper sloped surface-portion facing said under surface-portion of said upper flange member, the two last said surface-portions being at an angle, said body-surface having a lower surface-portion facing said upper surface-portion of said lower flange member and disposed at an angle thereto which is smaller than the first said angle, said bore of said body providing an inner surface therefor, with a lower surface-portion spaced from said post that extends from a point above said mounting plate to the lower end of the bore at said lower flange member.

3. An isolation mount as defined in claim 2 wherein said bore has an upper surface-portion which is diametrically smaller than said lower surface-portion of said bore.

4. An isolation mount as defined in claim 3 wherein said body has a portion of substantially uniform thickness collateral with a part of said recess.

5. An isolation mount as defined in claim 3 but characterized by means associated with said spool to vary the spacing between said flange members.

6. An isolation mount as defined in claim 3 but characterized by said post having a boss collateral with said mounting plate, said boss being spaced from said body.

7. A resilient mount of the type described comprising, in combination when vertical, an upper flange member having a lower surface-portion, a lower flange member having an upper sloped surface-portion, a post interconnecting said flange members in spaced relation to form a spool, a resilient annular body between said flange members and having an inner bore surrounding said post, said body being thicker adjacent said lower flange member than adjacent said upper flange member, a mounting plate secured in a recess in said thicker portion of said body near the end thereof adjacent said lower flange member, said body having a portion between said mounting plate and said lower flange member, said body having an outer surface with an upper sloped surface-portion facing said under surface-portion of said upper flange member, said body-surface having a bottom surface-portion facing said sloped upper surface-portion of said lower flange member, said bore of said body providing an inner surface therefor, said bore having a lower surface-portion spaced from said post, the last said surface-portion extending from a point above said mounting plate to the lower end of the bore at said lower flange member, said bottom surface-portion and said upper surface-portion of said lower flange member diverging in a direction outwardly from said post.

8. An isolation mount as defined in claim 7 but characterized by means associated with said spool to vary the spacing between said flange members.

9. As isolation mount as defined in claim 8 wherein said bore is spaced from said post throughout its length.

10. A resilient mount of low natural frequency comprising, in combination when vertical, an upper flange member having an under surface-portion, a lower flange member having an upper surface-portion, a post interconnecting said flange members in spaced relation to form a spool, a resilient annular body between said flange members and having an inner bore surrounding said post, said body having a relatively wider and thicker portion in the lower part of said body, the last said portion having a recess near the end thereof adjacent said lower flange member, a mounting plate in said recess, said body having an outer surface with an upper sloped surface-portion extending to said recessed surface-portion which faces and radially diverges from said under surface-portion of said upper flange member, said body-surface having a lower surface-portion facing and spaced from said upper surface-portion of said lower flange member, said bore of said body providing an inner surface therefor, said bore having a surface-portion spaced from said post, the last said surface-portion starting at a point on said body above said mounting plate and extending below said mounting plate, the last said surface-portion having a part above said mounting plate of increasing diameter downwardly.

11. A resilient mount as defined in claim 10 wherein said surface-portions of said flange members have portions sloping and diverging in a radially outwardly direction.

12. A resilient mount of low natural frequency comprising, in combination when vertical, an upper flange member having an under surface-portion, a lower flange member having an upper surface-portion, a post interconnecting said flange members in spaced relation to form a spool, a resilient annular body between said flange members and having an inner bore surrounding said post, said body having an outer recess in the lower part of said body and near the end thereof adjacent said lower flange member, a mounting plate in said recess, said body having a bottom portion between said mounting plate and said lower flange member, said body having an outer surface with an upper sloped surface-portion facing and radially diverging from said under surface-portion of said upper flange member, said body-surface having its entire bottom surface facing and spaced from said upper surface-portion of said lower flange member, said bore of said body providing an inner surface therefor, said bore having a surface-portion spaced from said post, the last said surface-portion starting at a point on said body above said mounting plate and extending below said mounting plate, the last said surface-portion having a part above said mounting plate of increasing diameter downwardly.

References Cited in the file of this patent

UNITED STATES PATENTS

| | | |
|---|---|---|
| 2,245,295 | Piron | June 10, 1941 |
| 2,456,087 | Schneider | Dec. 14, 1948 |
| 2,520,757 | Cain | Aug. 29, 1950 |
| 2,588,171 | Smith | Mar. 4, 1952 |
| 2,600,090 | Barber et al. | June 10, 1952 |
| 2,622,836 | Lee | Dec. 23, 1952 |
| 2,642,253 | Markowitz | June 16, 1953 |

FOREIGN PATENTS

| | | |
|---|---|---|
| 466,354 | Great Britain | May 26, 1937 |
| 586,608 | Great Britain | Mar. 25, 1947 |